US012710546B2

(12) United States Patent
Seok et al.

(10) Patent No.: US 12,710,546 B2
(45) Date of Patent: Aug. 18, 2026

(54) MOBILITY AND CONTROL METHOD THEREOF

(71) Applicants: Hyundai Motor Company, Seoul (KR); Kia Corporation, Seoul (KR)

(72) Inventors: Donghee Seok, Seoul (KR); Yocheol Jang, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 334 days.

(21) Appl. No.: 18/325,762

(22) Filed: May 30, 2023

(65) Prior Publication Data

US 2024/0111060 A1 Apr. 4, 2024

(30) Foreign Application Priority Data

Sep. 29, 2022 (KR) ........................ 10-2022-0123906

(51) Int. Cl.
*G01S 19/07* (2010.01)
*G01S 19/40* (2010.01)
(Continued)

(52) U.S. Cl.
CPC .............. *G01S 19/07* (2013.01); *G01S 19/40* (2013.01); *G01S 19/46* (2013.01); *G01S 19/48* (2013.01); *G16Y 20/10* (2020.01)

(58) Field of Classification Search
CPC ........ G01S 19/07; G01S 19/40; G01S 19/426; G01S 19/45; G01S 19/46; G01S 19/48
(Continued)

(56) References Cited

U.S. PATENT DOCUMENTS 8,793,031 B2 * 7/2014 Anantha ................ G06Q 10/10 701/1
9,671,501 B2 * 6/2017 Leandro .................. G01S 19/40
(Continued)

FOREIGN PATENT DOCUMENTS

CN 110291753 B * 2/2022 ............ H04W 72/23
EP 2351989 B1 9/2015
(Continued)

OTHER PUBLICATIONS

Hong-Gi et al., "Broadcasting, Precision Positioning Technology, and the Era of Autonomous Driving," Special Mobile Broadcasting: Present and Future, Munhwa Broadcasting Corporation, vol. 25 No. 3, Jul. 29, 2020, 18 pages.

*Primary Examiner* — Chuong P Nguyen
(74) *Attorney, Agent, or Firm* — Slater Matsil, LLP

(57) ABSTRACT

An embodiment mobility includes a first global navigation satellite system (GNSS) module configured to generate first location information using a first signal, an internet of things (IOT) communication module configured to receive correction information from a base station for correcting the first location information, a first calculation processing module configured to perform calculation of final location information using the first location information and the correction information, and a communication interface module configured to communicate with a user terminal that includes a second GNSS module configured to generate second location information using a second signal, wherein the first calculation processing module is configured to set the first GNSS module or the second GNSS module as a master module and to calculate the final location information using the first location information or the second location information generated by the set master module.

20 Claims, 6 Drawing Sheets

(51) Int. Cl.
*G01S 19/46* (2010.01)
*G01S 19/48* (2010.01)
*G16Y 20/10* (2020.01)

(58) Field of Classification Search
USPC ............ 342/357.44, 357.23, 357.28, 357.29, 342/357.31
See application file for complete search history.

(56) References Cited

U.S. PATENT DOCUMENTS

| | | | | |
|---|---|---|---|---|
| 9,869,771 | B2 | 1/2018 | Hwang | |
| 10,041,798 | B2 * | 8/2018 | Riley | G01C 21/005 |
| 10,106,115 | B2 * | 10/2018 | Sugimoto | B60R 21/013 |
| 10,180,499 | B2 * | 1/2019 | Lee | H04W 4/027 |
| 10,408,944 | B2 * | 9/2019 | Ashjaee | G01S 19/43 |
| 11,585,939 | B2 * | 2/2023 | Conquest | G01S 19/04 |
| 12,013,468 | B2 * | 6/2024 | Smolyakov | G01S 19/071 |
| 12,196,556 | B2 * | 1/2025 | Riley | G01S 5/0072 |
| 2010/0286912 | A1 * | 11/2010 | Inoue | G01S 19/48<br>701/470 |
| 2012/0232793 | A1 * | 9/2012 | Hagiwara | G01C 21/28<br>701/518 |
| 2014/0163870 | A1 | 6/2014 | Riley | |
| 2016/0252353 | A1 | 9/2016 | DeLuca | |
| 2017/0168164 | A1 | 6/2017 | Lee | |
| 2018/0208140 | A1 | 7/2018 | Sugimoto et al. | |
| 2021/0072403 | A1 | 3/2021 | Koide | |
| 2023/0025458 | A1 * | 1/2023 | Li | H04W 4/029 |

FOREIGN PATENT DOCUMENTS

| | | | | | |
|---|---|---|---|---|---|
| JP | 2004340633 | A | | 12/2004 | |
| JP | 2019203710 | A | | 11/2019 | |
| KR | 20170041587 | A | | 4/2017 | |
| KR | 102787096 | B1 | * | 3/2025 | G01S 19/40 |
| WO | WO-2017071650 | A1 | * | 5/2017 | G01S 19/04 |
| WO | WO-2024202924 | A1 | * | 10/2024 | G01S 19/25 |

* cited by examiner

MOBILITY AND CONTROL METHOD THEREOF

CROSS-REFERENCE TO RELATED APPLICATIONS

This application claims the benefit of Korean Patent Application No. 10-2022-0123906, filed on Sep. 29, 2022, which application is hereby incorporated herein by reference.

TECHNICAL FIELD

The disclosure relates to a mobility and a control method thereof.

BACKGROUND

A global navigation satellite system (GNSS) is a system capable of determining global location information, and a module for the GNSS is installed in a mobility, a terminal, and the like, to receive location information from satellites. In this instance, the module includes a GNSS sensor, and precision of the GNSS sensor varies depending on a performance of a built-in chip.

In order to increase precision of the GNSS sensor, software using a multiband or including various correction functions such as dead reckoning/real time kinematic (DR/RTK) may be included in a chip. Also, even though chips have the same performance, precision of the GNSS sensor may be affected by the performance or an installation location of an antenna.

Once installed in a mobility, however, a GNSS sensor may not be easily replaced, even when a GNSS sensor with improved performance has been developed. In addition, high performance GNSS sensors are not highly competitive in price.

U.S. Patent Publication No. 2018-0208140 (Jul. 26, 2018) and U.S. Patent Publication No. 2014-0163870 (Jun. 12, 2014) may provide information related to the subject matter of the present disclosure.

SUMMARY

The disclosure relates to a mobility and a control method thereof. Particular embodiments relate to a mobility using a global navigation satellite system (GNSS) and a control method thereof.

An embodiment of the disclosure provides a mobility and a control method thereof that may improve a performance of a GNSS module installed in the mobility.

Additional embodiments of the disclosure will be set forth in part in the description which follows and, in part, will be obvious from the description, or may be learned by practice of the disclosure.

In accordance with an embodiment of the disclosure, a mobility may include a first global navigation satellite system (GNSS) module configured to generate location information using a signal received from a GNSS, an internet of things (IOT) communication module configured to receive correction information from a base station for correcting the location information, a first calculation processing module configured to perform calculation of the location information using the location information generated by the first GNSS module and the correction information received from the IOT communication module, and a communication interface module configured to communicate with a user terminal including a second GNSS module configured to generate location information using a signal received from the GNSS, wherein the first calculation processing module may be configured to set one of the first GNSS module and the second GNSS module as a master module and to calculate location information using location information generated by the set master module.

Based on the first GNSS module being set as the master module, the first calculation processing module may be configured to perform calculation of the location information using the location information generated by the first GNSS module and the correction information received from the IOT communication module and to transmit the calculated location information to the user terminal to share.

The first calculation processing module may be configured to compare a model of the first GNSS module and a model of the second GNSS module to set the master module.

The first calculation processing module may be configured to compare a performance of the first GNSS module and a performance of the second GNSS module to set the master module.

Each of the performance of the first GNSS module and the performance of the second GNSS module may be evaluated using at least one measurement result of a response time or an amount of satellite information using a test signal.

The mobility may further include a first GNSS antenna configured to receive a signal about the location information from the GNSS.

The user terminal may further include a terminal communication module configured to receive correction information from a base station for correcting the location information and to communicate with the communication interface module and a second calculation processing module configured to perform calculation of the location information using the location information generated by the second GNSS module and the correction information received from the terminal communication module.

Based on the second GNSS module being set as the master module, the second calculation processing module may be configured to perform calculation of the location information using the location information generated by the second GNSS module and the correction information received from the terminal communication module and to transmit the calculated location information to the first calculation processing module to share.

The mobility may further include a first GNSS antenna configured to receive a signal about the location information from the GNSS, wherein the second GNSS module may be configured to receive the signal received from the first GNSS antenna to generate the location information.

The second calculation processing module may be configured to compare a model of the first GNSS module and a model of the second GNSS module to set the master module.

The second calculation processing module may be configured to compare a performance of the first GNSS module and a performance of the second GNSS module to set the master module.

In accordance with an embodiment of the disclosure, a control method of a mobility may include operating a first GNSS module configured to generate location information of the mobility using a signal received from a GNSS and a second GNSS module configured to generate location information of a user terminal using a signal received from the GNSS, communicatively connecting the mobility and the user terminal, and setting one of the first GNSS module or the second GNSS module as a master module, wherein a calculation processing module may be configured to perform calculation of the location information using location information generated by the master module and correction information about the location information provided by a base station.

Based on the first GNSS module being set as the master module, the calculation processing module is a first calculation processing module included in the mobility and configured to perform calculation of the location information using the location information of the mobility generated by the first GNSS module and to set the master module.

The control method may further include sharing the location information calculated by the first calculation processing module with the user terminal.

The first calculation processing module may be configured to compare a model of the first GNSS module and a model of the second GNSS module to set the master module.

The first calculation processing module may be configured to compare a performance of the first GNSS module and a performance of the second GNSS module to set the master module.

Each of the performance of the first GNSS module and the performance of the second GNSS module may be evaluated using at least one measurement result of a response time or an amount of satellite information using a test signal.

Based on the second GNSS module being set as the master module, the calculation processing module is a second calculation processing module included in the user terminal and configured to perform calculation of the location information of the user terminal using the location information generated by the second GNSS module and to set the master module.

The control method may further include sharing the location information calculated by the second calculation processing module with the mobility.

The correction information about the location information provided by the base station is at least one of correction information about the location information of the mobility or correction information about the location information of the user terminal.

BRIEF DESCRIPTION OF THE DRAWINGS

These and/or other embodiments of the disclosure will become apparent and more readily appreciated from the following description of the embodiments, taken in conjunction with the accompanying drawings, in which.

DETAILED DESCRIPTION OF ILLUSTRATIVE EMBODIMENTS

Figure 1:
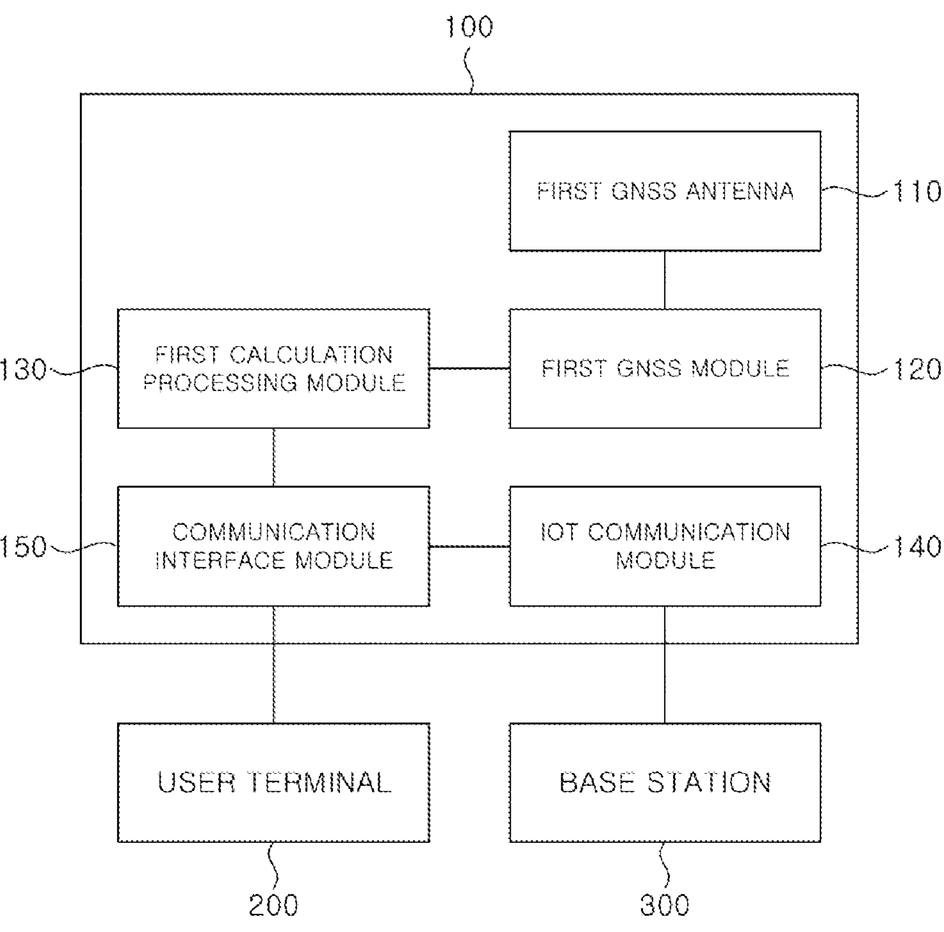
FIG. 1 is a block diagram illustrating a mobility according to an embodiment.

Hereinafter, embodiments will be described in detail with reference to the accompanying drawings. The embodiments disclosed below are illustrative of the technical idea of the disclosure, and those skilled in the art will appreciate that various modifications, changes, and substitutions may be made without departing from the essential characteristics thereof. Parts irrelevant to description are omitted in the drawings in order to clearly explain embodiments. In the drawings, a width, length, thickness, and the like of constituent components may be exaggerated for convenience. Like reference numerals throughout the specification denote like elements.

Referring to FIG. 1, a mobility 100 according to an embodiment is described. The mobility 100 according to an embodiment may measure a location using a global navigation satellite service (GNSS) and may include a first GNSS antenna 110, a first GNSS module 120, a first calculation processing module 130, an internet of things (IOT) communication module 140, and a communication interface module 150.

The first GNSS antenna 110 is mounted on the mobility 100 and receives a signal including location information from the GNSS. Here, the mobility 100 may include a vehicle as well as a means of transportation enabling a user to move such as an autonomous vehicle, a motorized scooter, a bicycle, an electric bicycle, and the like. The first GNSS antenna 110 is mounted on the above-described mobility 100 at a position suitable to communicate with an external device using the GNSS. For example, the first GNSS antenna 110 may be mounted on a window located on a rear of a vehicle or a roof of a vehicle.

The first GNSS module 120 is installed in the mobility 100 and receives location information of the mobility 100 from the GNSS through the first GNSS antenna 110. The first GNSS module 120 may receive absolute coordinates of a vehicle based on a global positioning system (GPS), a differential GPS (DGPS), a network real time kinematic (network-RTK), and the like, through satellites and may generate location data (e.g., latitude and longitude coordinates, direction, speed, quality, etc.) based on the received absolute coordinates.

The first calculation processing module 130 derives a final location of the mobility 100 using the location data generated by the first GNSS module 120 and correction information received through the IOT communication module 140. Also, when a GNSS module is included in another terminal communicating with the mobility 100 through the communication interface module 150, the first calculation processing module 130 may perform calculation for evaluating a performance of the first GNSS module 120.

For example, in an embodiment, when the mobility 100 is communicatively connected to a user terminal 200 through the communication interface module 150 and a second GNSS module 220 is included in the user terminal 200, the performance of the first GNSS module 120 may be evaluated to compare the performance of the first GNSS module 120 and the second GNSS module 220.

Alternatively, the first calculation processing module 130 may select a GNSS module with higher performance by comparing a model of the first GNSS module 120 included in the mobility 100 and a model of the second GNSS module 220 included in the user terminal 200.

The above-described first calculation processing module 130 may be an electronic control unit (ECU) included in the mobility 100, use a processor for calculation, and be implemented as an arithmetic unit including a microprocessor, a memory, and the like. An implementation method thereof is apparent to those skilled in the art, and thus a further detailed description is omitted.

The IOT communication module 140 may receive correction information about the location information from at least one base station 300. The correction information received through the IOT communication module 140 of the mobility 100 from the base station 300 may be transmitted to the first calculation processing module 130. For example, the IOT communication module 140 may be a digital multimedia broadcasting (DMB) module.

The communication interface module 150 is provided for communication between the mobility 100 and the user terminal 200. For example, the communication interface module 150 may be a device for wireless communication such as Wi-Fi, Bluetooth, or the like, between the mobility 100 and the user terminal 200, without being limited thereto. The communication interface module 150 may be a device for wired communication between the mobility 100 and the user terminal 200.

Figure 2:
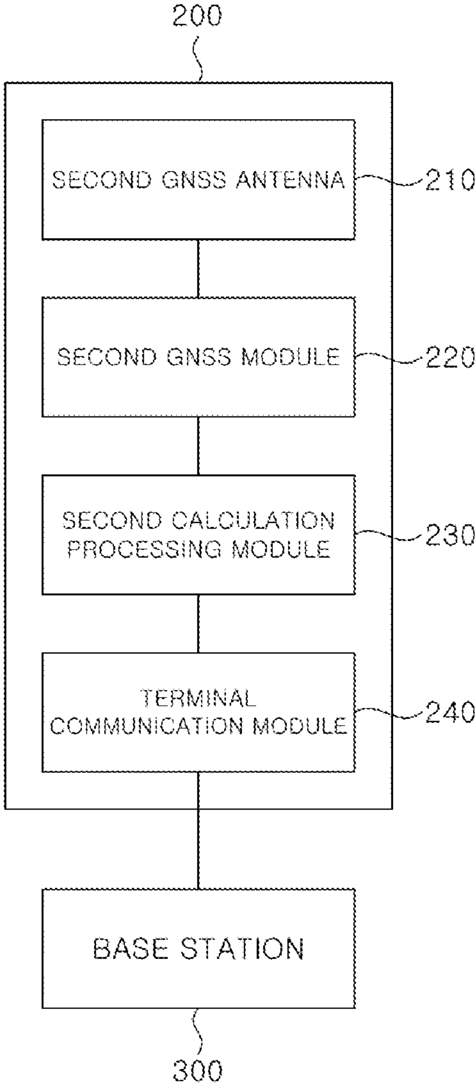
FIG. 2 is a block diagram illustrating a user terminal communicating with a mobility according to an embodiment.

As shown in FIG. 2, the user terminal 200 communicating with the mobility 100 described above may include a second GNSS antenna 210, a second GNSS module 220, a second calculation processing module 230, and a terminal communication module 240. In an embodiment, the user terminal 200 may be a terminal capable of using the GNSS and may be various types of terminals such as a tablet personal computer (PC), a laptop, a smartphone, and the like.

The second GNSS antenna 210 provided in the user terminal 200 receives a signal including location information from the GNSS. The second GNSS antenna 210 may be disposed inside the user terminal 200.

The second GNSS module 220 provided in the user terminal 200 receives location information of the user terminal 200 from the GNSS through the second GNSS antenna 210. The second GNSS module 220 may receive absolute coordinates of a vehicle based on a GPS, a DGPS, a network-RTK, and the like, through satellites and may generate location data (e.g., latitude and longitude coordinates, direction, speed, quality, etc.) based on the received absolute coordinates.

The second calculation processing module 230 derives a final location of the user terminal 200 using the location data generated by the second GNSS module 220 and correction information received through the terminal communication module 240. Also, when communicating with the mobility 100 through the terminal communication module 240, the second calculation processing module 230 may perform calculation for evaluating a performance of the second GNSS module 220.

For example, when the mobility 100 is communicatively connected to the user terminal 200 through the terminal communication module 240 and the first GNSS module 120 is included in the mobility 100, the performance of the second GNSS module 220 may be evaluated to compare the performance of the first GNSS module 120 and the second GNSS module 220.

Alternatively, the second calculation processing module 230 may select a GNSS module with higher performance by comparing a model of the first GNSS module 120 included in the mobility 100 and a model of the second GNSS module 220 included in the user terminal 200.

The above-described second calculation processing module 230 may be implemented as an arithmetic unit such as an application processor (AP) or a central processing unit (CPU) included in the user terminal 200. An implementation method thereof is apparent to those skilled in the art, and thus a further detailed description is omitted.

The terminal communication module 240 may receive correction information about the location information from at least one base station 300. The correction information received through the terminal communication module 240 of the user terminal 200 from the base station 300 may be transmitted to the second calculation processing module 230. The terminal communication module 240 may communicate with the base station 300 through a mobile communication network, an internet network, or a local area network.

Also, the terminal communication module 240 may communicate with the mobility 100. For example, the terminal communication module 240 may communicate with the mobility 100 through wireless communication such as Wi-Fi, Bluetooth, or the like, without being limited thereto. The terminal communication module 240 may communicate with the mobility 100 through wired communication.

Referring to FIG. 3 to FIG. 6, a control method of a mobility using a GNSS according to an embodiment is described. In the embodiment, when using the GNSS, the mobility 100 may measure location information of the mobility 100 by using the first GNSS module 120 included in the mobility 100, together with the second GNSS module 220 included in the user terminal 200 owned by a user located in the mobility 100. Although it is described in the embodiment that a single user terminal 200 communicates with the mobility 100, a plurality of user terminals 200 may communicate with the mobility 100 as required.

In the embodiment, the mobility 100 obtains location information of the mobility 100 using the first GNSS module 120 included in the mobility 100 itself. However, when communicatively connected to the user terminal 200 which is another terminal capable of using the GNSS, the mobility 10 may set, as a master module, one of the first GNSS module 120 and the second GNSS module 220, which is included in the user terminal 200, and share and use location information, measured by the master module, with the user terminal 200.

Figure 3:
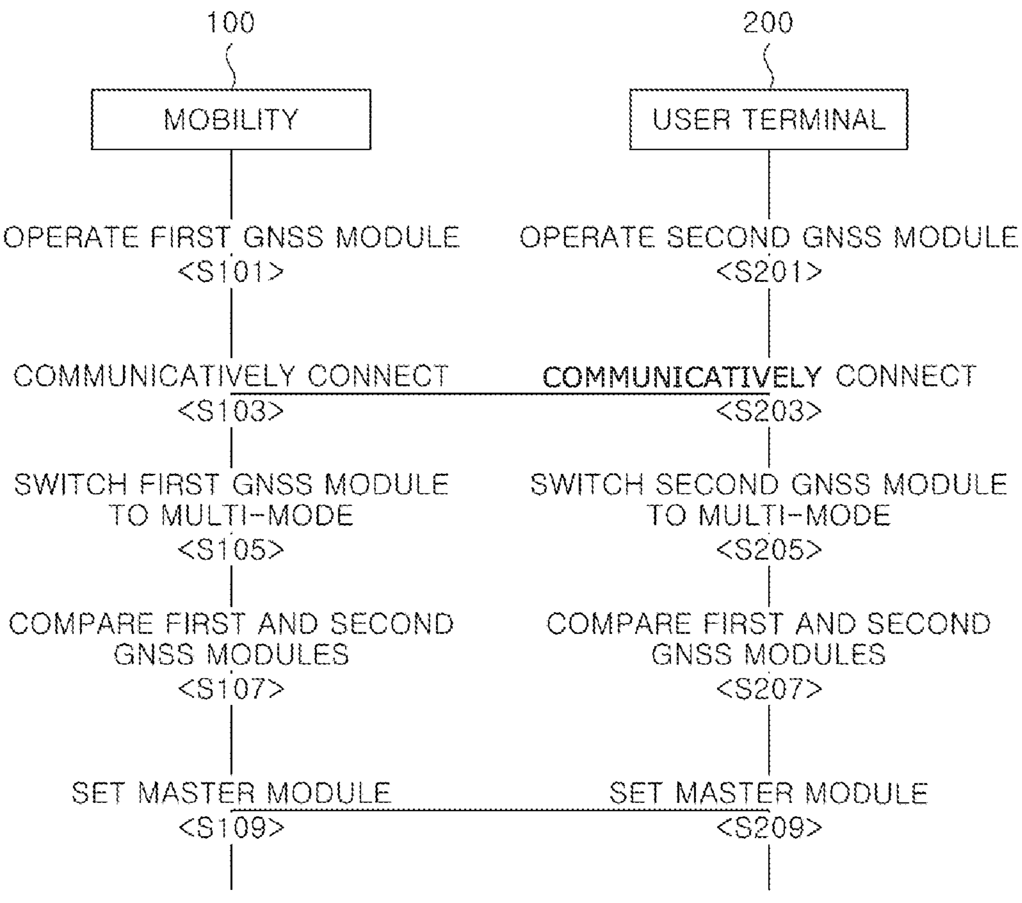
FIG. 3 is a flowchart illustrating setting a master module in a control method of a mobility according to an embodiment.

Referring to FIG. 3, operations of setting a master module when the mobility 100 is communicatively connected to the user terminal 200 are described.

The first GNSS module of the mobility is operated (S101).

The first GNSS module 120 included in the mobility 100 is operated to measure a location of the mobility 100 using a GNSS. The first GNSS module 120 measures location information of the mobility 100 using a signal received through the first GNSS antenna 110. Here, the first GNSS module 120 may be operated when the mobility 100 is operated, without a separate switch for operating the first GNSS module 120, and the like.

The second GNSS module of the user terminal is operated (S201).

The second GNSS module 220 included in the user terminal 200 is operated to measure a location of the user terminal 200 using the GNSS. The second GNSS module 220 included in the user terminal 200 may measure location information of the user terminal 200 using a signal received through the second GNSS antenna 210.

When the user terminal 200 is set to measure location information independently from operation S101, the second GNSS module 220 may be operated at the same time that the user terminal 200 is operated.

The mobility and the user terminal are communicatively connected to each other (S103 and S203).

The communication interface module 150 of the mobility 100 and the terminal communication module 240 of the user terminal 200 are communicatively connected to each other through wireless or wired communication. For example, the communication interface module 150 and the terminal communication module 240 may be connected to each other via Wi-Fi or Bluetooth.

Here, after communication between the communication interface module 150 and the terminal communication module 240 is initially performed (e.g., automatic connection of Wi-Fi or pairing via Bluetooth communication is performed), when the mobility 100 and the user terminal 200 are within a predetermined distance, the communication may be automatically performed.

Also, after the mobility 100 and the user terminal 200 are communicatively connected, whether the communication between the mobility 100 and the user terminal 200 is performed may be confirmed regularly. As a result of confirmation, when the mobility 100 is disconnected from the user terminal 200, returning to operation S101 and operation S201 may be performed.

The first GNSS module is switched to a multi-mode (S105).

When communicatively connected to the user terminal 200 through the communication interface module 150, the first GNSS module 120 is switched to the multi-mode. In the multi-mode, one of a plurality of GNSS modules may be operated as a master module, and location information of the master module is used as it is without operating the other GNSS modules which are not the master module.

The second GNSS module is switched to the multi-mode (S205).

When communicatively connected to the mobility 100 through the terminal communication module 240, the second GNSS module 220 is switched to the multi-mode like the first GNSS module 120.

A model of the first GNSS module and a model of the second GNSS module are compared to each other (S107 and S207).

The first calculation processing module 130 compares specifications for the models of the first GNSS module 120 and the second GNSS module 220. In this instance, the specifications for the first GNSS module 120 and the second GNSS module 220 may include information about additional functions such as a model name, band coverage, dead reckoning/real time kinematic (DR/RTK), and the like, for each module. A database in which the specifications for the first GNSS module 120 and the second GNSS module 220 are tabulated may be used.

Also, like the first calculation processing module 130, the second calculation processing module 230 compares the specifications by using the tabulated database for the first GNSS module 120 and the second GNSS module 220.

Each of the first calculation processing module 130 and the second calculation processing module 230 performs comparison of the specifications for the first GNSS module 120 and the second GNSS module 220 to determine which GNSS module has a higher performance. The comparison of the specifications for the first GNSS module 120 and the second GNSS module 220 is performed because an earlier released module may not include information about a later released module among the first GNSS module 120 and the second GNSS module 220. That is, by comparing the specifications for the first GNSS module 120 and the second GNSS module 220 by each of the first calculation processing module 130 and the second calculation processing module 230, a relatively higher performance module may be confirmed.

The master module is set (S109 and S209).

By using a result of the comparison of the specifications for the first GNSS module 120 and the second GNSS module 220 by the first calculation processing module 130 in operation S107 and a result of the comparison of the specifications for the first GNSS module 120 and the second GNSS module 220 by the second calculation processing module 230 in operation S207, each of the first calculation processing module 130 and the second calculation processing module 230 sets a master module with higher performance. Here, when the results obtained by the first calculation processing module 130 and the second calculation processing module 230 are identical to each other, a corresponding GNSS module is set as the master module.

However, when any one of the first calculation processing module 130 and the second calculation processing module 230 may not obtain a performance comparison result of the first GNSS module 120 and the second GNSS module 220, the master module is set based on a performance comparison result obtained by the other calculation processing module that obtained the performance comparison result. For example, when a performance comparison result is not obtained by the first calculation processing module 130, and the second calculation processing module 230 obtains a performance comparison result that the second GNSS module 220 has a higher performance, both the first calculation processing module 130 and the second calculation processing module 230 set the second GNSS module 220 as the master module.

Also, when the performance comparison results obtained by each of the first calculation processing module 130 and the second calculation processing module 230 are different from each other, a module which was released later between the first GNSS module 120 and the second GNSS module 220 may be set as the master module.

Here, setting the first GNSS module 120 as the master module indicates that the first GNSS module 120 included in the mobility 100 collects and generates location information and the first calculation processing module 130 calculates the location information by including correction information. Likewise, setting the second GNSS module 220 as the master module indicates that the second GNSS module 220 included in the user terminal 200 collects and generates location information and the second calculation processing module 230 calculates the location information by including correction information.

Figure 4:
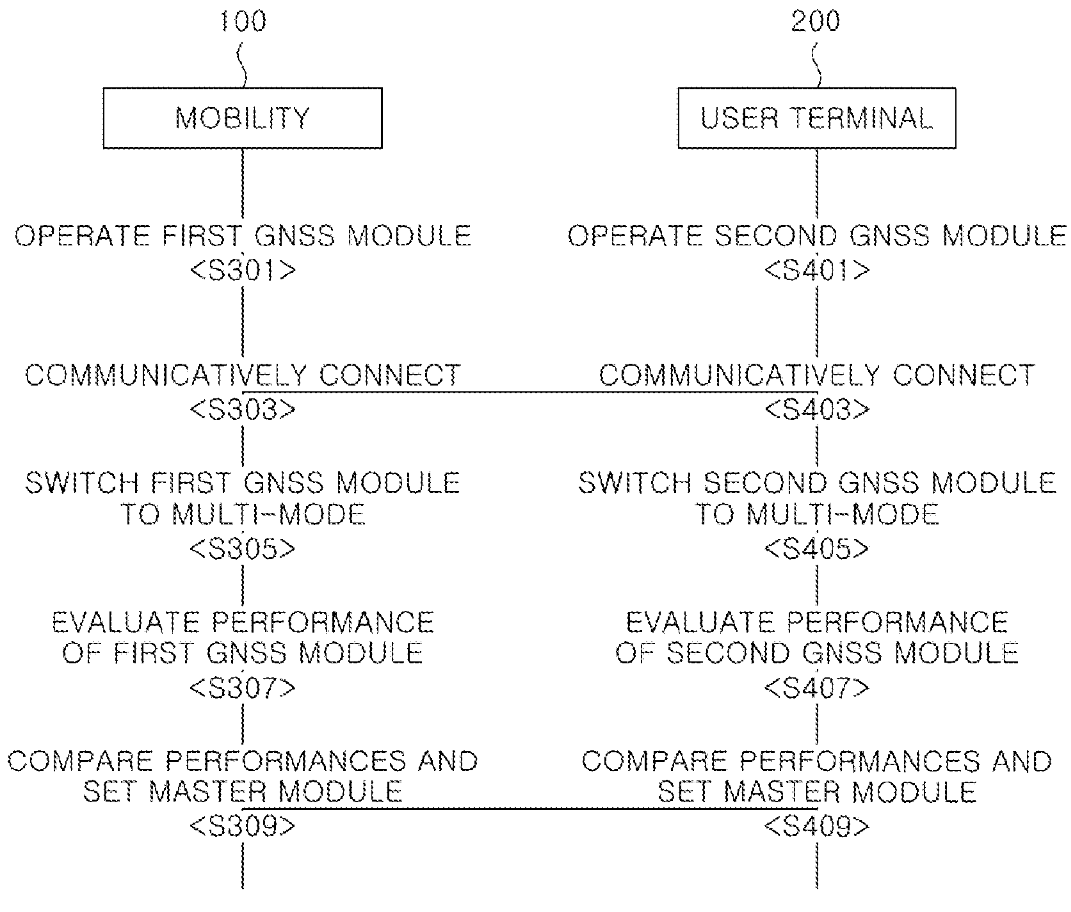
FIG. 4 is a flowchart illustrating a modified example of setting a master module in a control method of a mobility according to an embodiment.

Referring to FIG. 4, a modified example of setting a master module is described. Because the modified example is mostly the same as the operations described with reference to FIG. 3, only operations different from those of FIG. 3 are described in detail.

The first GNSS module of the mobility is operated (S301), and the second GNSS module of the user terminal is operated (S401).

The operation S301 is identical to the operation S101, and the operation S401 is identical to the operation S201, and thus the detailed descriptions thereof are omitted.

The mobility and the user terminal are communicatively connected to each other (S303 and S403).

The operation S303 is identical to the operation S103, and the operation S403 is identical to the operation S203, and thus the detailed descriptions thereof are omitted.

The first GNSS module is switched to a multi-mode (S305), and the second GNSS module is switched to a multi-mode (S405).

The operation S305 is identical to the operation S105, and the operation S405 is identical to the operation S205, and thus the detailed descriptions thereof are omitted.

A performance of the first GNSS module is evaluated (S307) and a performance of the second GNSS module is evaluated (S407).

The first calculation processing module 130 evaluates the performance of the first GNSS module 120, and the second calculation processing module 230 evaluates the performance of the second GNSS module 220. In this instance, in order to evaluate the performance of the first GNSS module 120, the first calculation processing module 130 confirms a response time and the amount of satellite information using a test signal. Also, the second calculation processing module 230 confirms a response time and the amount of satellite information using a test signal in order to evaluate the performance of the second GNSS module 220.

Here, the test signal used in each of the first calculation processing module 130 and the second calculation processing module 230 may be the same. To this end, the first calculation processing module 130 and the second calculation processing module 230 may exchange the corresponding test signal.

Performance comparison is performed and a master module is set (S309 and S409).

Each of the first calculation processing module 130 and the second calculation processing module 230 compares the performance of the first GNSS module 120 and the performance of the second GNSS module 220 by using the performance evaluation results of the first GNSS module 120 and the second GNSS module 220 obtained in operation S307 and operation S407, respectively. That is, each of the first calculation processing module 130 and the second calculation processing module 230 performs comparison of the performance with respect to the response time and the amount of satellite information of each of the first GNSS module 120 and the second GNSS module 220.

Here, the first calculation processing module 130 and the second calculation processing module 230 determine that performance is higher as the response time is shorter and as the amount of satellite information increases and set a GNSS module with higher performance as the master module.

Here, setting the first GNSS module 120 as the master module indicates that the first GNSS module 120 included in the mobility 100 collects and generates location information and the first calculation processing module 130 calculates the location information by including correction information. Likewise, setting the second GNSS module 220 as the master module indicates that the second GNSS module 220 included in the user terminal 200 collects and generates location information and the second calculation processing module 230 calculates the location information by including correction information.

Figure 5:
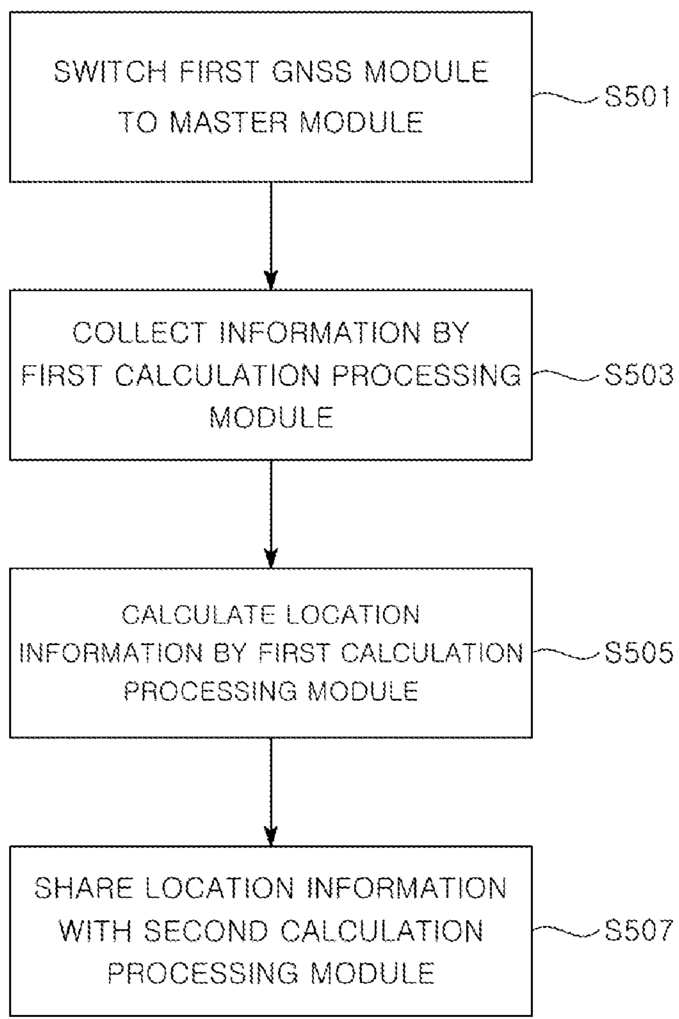
FIG. 5 is a flowchart illustrating operations when a mobility is set as a master module in a control method of a mobility according to an embodiment.

Referring to FIG. 5, according to an embodiment, described are operations of processing location information by the first GNSS module 120 when the first GNSS module 120 is set as a master module.

The first GNSS module is switched to a master module (S501).

When the first GNSS module 120 is set as the master module in operation S109 and operation S209 or in operation S309 and operation S409, the first GNSS module 120 is switched to be operated as the master module. In switching to the master module, location information is collected to measure a location, and the measured location information is shared with a GNSS module which is not the master module.

The first calculation processing module 130 collects location information (S503).

The first GNSS module 120 receives a signal including location information from the first GNSS antenna 110, generates location information based on the received signal, and then transmits the location information to the first calculation processing module 130. Also, the IOT communication module 140 receives correction information about the location information of the mobility 100 from the base station 300 and transmits the received correction information to the first calculation processing module 130.

Also, the terminal communication module 240 of the user terminal 200 receives correction information about location information of the user terminal 200 from the base station 300 and transmits the received correction information to the first calculation processing module 130 through the communication interface module 150 of the mobility 100.

That is, the first calculation processing module 130 collects the location information generated by the first GNSS module 120, the correction information about the location information of the mobility 100 received by the IOT communication module 140, and the correction information about the location information of the user terminal 200 received by the terminal communication module 240 of the user terminal 200.

The first calculation processing module 130 calculates the location information (S505).

The first calculation processing module 130 calculates the location information of the mobility 100 by using the collected information, i.e., the location information generated by the first GNSS module 120, the correction information about the location information of the mobility 100 received by the IOT communication module 140, and the correction information about the location information of the user terminal 200 received by the terminal communication module 240 of the user terminal 200.

The first calculation processing module 130 shares the location information with the second calculation processing module 230 of the user terminal 200 (S507).

The first calculation processing module 130 uses the calculated location information as location information of the mobility 100 and transmits the location information to the second calculation processing module 230 of the user terminal 200 as a location of the user terminal 200. In this instance, the first calculation processing module 130 may transmit the location information to the second calculation processing module 230 through communication with the communication interface module 150 and the terminal communication module 240.

Figure 6:
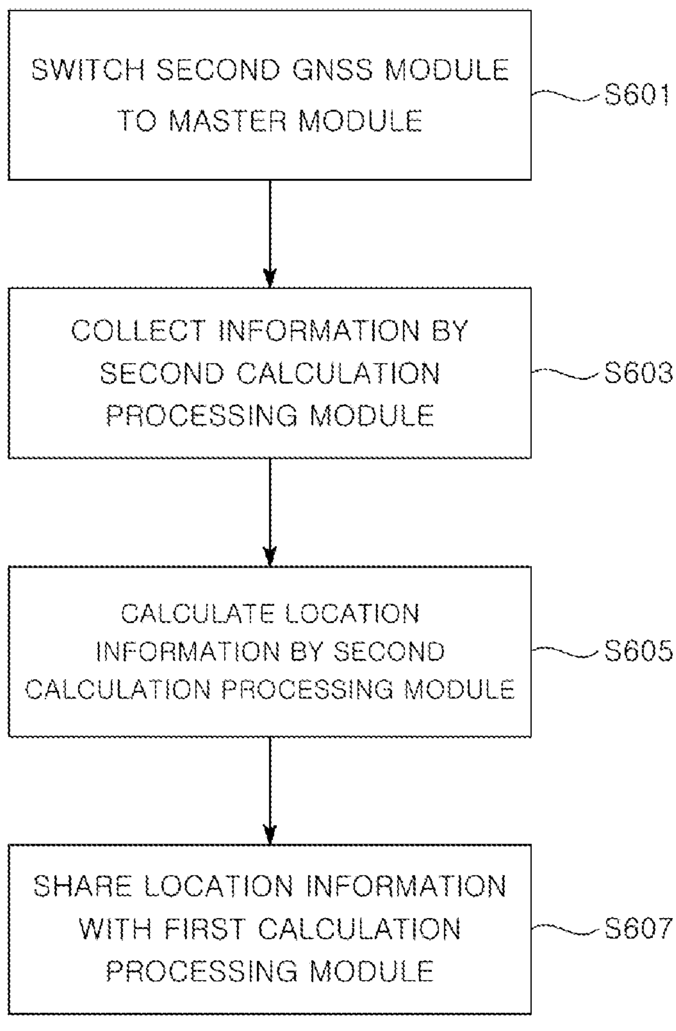
FIG. 6 is a flowchart illustrating operations when a user terminal is set as a master module in a control method of a mobility according to an embodiment.

Referring to FIG. 6, according to an embodiment, described are operations of processing location information by the second GNSS module 220 when the second GNSS module 220 is set as a master module.

The second GNSS module is switched to a master module (S601).

When the second GNSS module 220 is set as the master module in operation S109 and operation S209 or in operation S309 and operation S409, the second GNSS module 220 is switched to be operated as the master module. In switching to the master module, location information is collected to measure a location, and the measured location information is shared with a GNSS module which is not the master module.

The second calculation processing module 230 collects location information (S603).

The second GNSS module 220 receives a signal including location information from the first GNSS antenna 110, generates location information based on the received signal, and then transmits the location information to the second calculation processing module 230. Also, the terminal communication module 240 receives correction information about the location information of the user terminal 200 from the base station 300 and transmits the received correction information to the second calculation processing module 230.

Here, the second GNSS module 220 may receive the signal including location information from the first GNSS antenna 110, not from the second GNSS antenna 210, because the first GNSS antenna 110 mounted on an outside of the mobility 100 has a relatively higher performance than the second GNSS antenna 210 included in the user terminal 200. Because a performance of an actual antenna is greatly affected by its size and installation location, the first GNSS antenna 110 mounted on the mobility 100 is highly likely to have a higher performance.

Also, the IOT communication module 140 of the mobility 100 receives correction information about the location information of the mobility 100 from the base station 300 and transmits the received correction information to the second calculation processing module 230 through the communication interface module 150 of the mobility 100.

That is, the second calculation processing module 230 collects the location information generated by the second GNSS module 220, the correction information about the location information of the user terminal 200 received by the terminal communication module 240 of the user terminal 200, and the correction information about the location information of the mobility 100 received by the IOT communication module 140.

The second calculation processing module 230 calculates the location information (S605).

The second calculation processing module 230 calculates the location information of the user terminal 200 (or location information of the mobility 100) by using the collected information, i.e., the location information generated by the second GNSS module 220, the correction information about the location information of the user terminal 200 received by the terminal communication module 240 of the user terminal 200, and the correction information about the location information of the mobility 100 received by the IOT communication module 140.

The second calculation processing module 230 shares the location information with the first calculation processing module of the mobility (S607).

The second calculation processing module 230 uses the calculated location information of the user terminal 200 (or calculated location information of the mobility 100) as location information of the mobility 100 and transmits the location information to the first calculation processing module 130 of the mobility 100 as a location of the user terminal 200. In this instance, the second calculation processing module 230 may transmit the location information to the first calculation processing module 130 through communication with the communication interface module 150 and the terminal communication module 240.

As is apparent from the above, according to the embodiments of the disclosure, a mobility and a control method thereof can operate a GNSS sensor together with a GNSS sensor installed in a user terminal in a multi-environment, thereby improving an overall performance of GNSS sensors.

According to the embodiments of the disclosure, because precision of a GNSS sensor may vary depending on the performance of an antenna, the performance of a GNSS sensor can be improved by using an antenna installed in a mobility.

What is claimed is:

1. A mobility comprising:

a first global navigation satellite system (GNSS) module configured to generate first location information using a first GNSS signal;

an internet of things (IOT) communication module configured to receive correction information for correcting the first location information from a base station;

a first calculation processing module configured to perform calculation of final location information using the first location information generated by the first GNSS module and the correction information received from the IOT communication module; and a communication interface module configured to communicate with a user terminal that comprises a second GNSS module configured to generate second location information using a second GNSS signal;

wherein the first calculation processing module is configured to set the first GNSS module or the second GNSS module as a master module and to calculate the final location information using the first location information or the second location information generated by the master module;

wherein the first calculation processing module is configured to compare a performance of the first GNSS module and a performance of the second GNSS module to set the master module, wherein the performance of the first GNSS module and the performance of the second GNSS module are evaluated using at least one measurement result of a response time or an amount of satellite information using a test signal; and wherein the first calculation processing module is configured to confirm at least the response time or the amount of satellite information using the test signal, to perform comparison of the performance with respect to at least the response time or the amount of satellite information of each of the first GNSS module and the second GNSS module, and to determine that the performance is higher as the response time is shorter or as the amount of satellite information increases and set a GNSS module with higher performance as the master module.

2. The mobility of claim 1, wherein, based on the first GNSS module being set as the master module, the first calculation processing module is configured to:

perform calculation of the final location information using the first location information generated by the first GNSS module and the correction information received from the IOT communication module; and transmit the final location information to the user terminal to share.

3. The mobility of claim 1, wherein the first calculation processing module is configured to compare specifications for a model of the first GNSS module and specifications for a model of the second GNSS module to set the master module.

4. The mobility of claim 1, further comprising a first GNSS antenna configured to receive the first GNSS signal about the first location information from a GNSS.

5. The mobility of claim 1, wherein the user terminal further comprises:

a terminal communication module configured to receive the correction information for correcting the first location information and to communicate with the communication interface module; and a second calculation processing module configured to perform calculation of the final location information using the second location information generated by the second GNSS module and the correction information received from the terminal communication module.

6. The mobility of claim 5, wherein, based on the second GNSS module being set as the master module, the second calculation processing module is configured to:

perform calculation of the final location information using the second location information generated by the second GNSS module and the correction information received from the terminal communication module; and transmit the final location information to the first calculation processing module to share.

7. The mobility of claim 6, further comprising a first GNSS antenna configured to receive the second GNSS signal about the second location information from a GNSS, wherein the second GNSS module is configured to receive the second GNSS signal received from the first GNSS antenna to generate the second location information.

8. The mobility of claim 5, wherein the second calculation processing module is configured to compare specifications for a model of the first GNSS module and specifications for a model of the second GNSS module to set the master module.

9. The mobility of claim 5, wherein the second calculation processing module is configured to compare a performance of the first GNSS module and a performance of the second GNSS module to set the master module; and wherein the second calculation processing module is configured to confirm at least a response time or amount of satellite information using a test signal, to perform comparison of the performance with respect to at least the response time or the amount of satellite information of each of the first GNSS module and the second GNSS module, and to determine that the performance is higher as the response time is shorter or as the amount of satellite information increases and set a GNSS module with higher performance as the master module.

10. A control method of a mobility, the control method comprising:

operating a first global navigation satellite system (GNSS) module to generate location information of the mobility using a first GNSS signal;

operating a second GNSS module to generate location information of a user terminal using a second GNSS signal;

communicatively connecting the mobility and the user terminal;

setting the first GNSS module or the second GNSS module as a master module; and calculating final location information using the location information generated by the master module and correction information about the location information received from a base station;

wherein the setting comprises:

confirming at least a response time or amount of satellite information using a test signal;

performing comparison of the performance with respect to at least the response time or the amount of satellite information of each of the first GNSS module and the second GNSS module;

determining that the performance is higher as the response time is shorter or as the amount of satellite information increases; and setting a GNSS module with higher performance as the master module.

11. The control method of claim 10, wherein the first GNSS module is set as the master module and wherein the mobility calculates the final location information using the location information of the mobility generated by the first GNSS module and sets the master module.

12. The control method of claim 10, wherein the second GNSS module is set as the master module and wherein the user terminal calculates the final location information of the user terminal using the location information generated by the second GNSS module and sets the master module.

13. The control method of claim 12, further comprising sharing the final location information calculated by the user terminal with the mobility.

14. The control method of claim 10, wherein the correction information about the location information is at least one of correction information about the location information of the mobility or correction information about the location information of the user terminal.

15. A control method of a mobility, the control method comprising:

operating a first global navigation satellite system (GNSS) module to generate location information of the mobility using a first GNSS signal, the first global navigation satellite system (GNSS) module being installed in the mobility;

communicatively connecting the mobility and a user terminal;

receiving a second GNSS signal from a second GNSS module of the user terminal to generate location information of the user terminal;

setting, by the mobility, the first GNSS module as a master module; and calculating, by the mobility, final location information using the location information generated by the mobility and correction information about the location of the mobility received from a base station.

16. The control method of claim 15, further comprising sharing the final location information calculated by the mobility with the user terminal.

17. The control method of claim 15, wherein setting the master module comprises comparing specifications for a model of the first GNSS module and specifications for a model of the second GNSS module.

18. The control method of claim 15, wherein setting the master module comprises:

confirming at least a response time or amount of satellite information using a test signal;

performing comparison of the performance with respect to at least the response time or the amount of satellite information of each of the first GNSS module and the second GNSS module;

determining that the performance is higher as the response time is shorter or as the amount of satellite information increases; and setting a GNSS module with higher performance as the master module.

19. The control method of claim 15, wherein communicatively connecting comprises automatically connecting the mobility and the user terminal when the mobility and the user terminal are within a predetermined distance of each other.

20. The control method of claim 15, further comprising regularly confirming whether communication between the mobility and the user terminal is maintained, and reverting to operating the first GNSS module independently to generate the location information of the mobility when the mobility is disconnected from the user terminal.

* * * * *